(12) United States Patent
Dange et al.

(10) Patent No.: US 12,477,408 B2
(45) Date of Patent: Nov. 18, 2025

(54) METHOD AND SYSTEM FOR MANAGING CELL SELECTION IN A CELLULAR NETWORK BASED ON EARLY-MEASUREMENT FEATURE

(71) Applicant: Samsung Electronics Co., Ltd., Suwon-si (KR)

(72) Inventors: Amit Anandrao Dange, Bangalore (IN); Kailash Kumar Jha, Bangalore (IN); Aman Agarwal, Bangalore (IN); Nitesh Pushpak Shah, Bangalore (IN); Abhishek Kaswan, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 757 days.

(21) Appl. No.: 17/742,776

(22) Filed: May 12, 2022

(65) Prior Publication Data
US 2022/0369180 A1    Nov. 17, 2022

Related U.S. Application Data

(63) Continuation of application No. PCT/KR2022/006741, filed on May 11, 2022.

(30) Foreign Application Priority Data

May 13, 2021  (IN) .............................. 202141021672
Apr. 28, 2022  (IN) ............................. 2021 41021672

(51) Int. Cl.
    *H04W 36/00*    (2009.01)
    *H04W 48/20*    (2009.01)
(52) U.S. Cl.
    CPC ....... *H04W 36/0058* (2018.08); *H04W 48/20* (2013.01); *H04W 36/00692* (2023.05); *H04W 36/008355* (2023.05)

(58) Field of Classification Search
    CPC ......... H04W 36/0058; H04W 36/0083; H04W 36/008355
    See application file for complete search history.

(56) References Cited

U.S. PATENT DOCUMENTS 10,524,166 B2   12/2019   Youn et al.
2015/0237541 A1   8/2015   Kim et al.
(Continued)

FOREIGN PATENT DOCUMENTS

EP   2095672 B1   6/2010
EP   3043600 B1   7/2018
(Continued)

OTHER PUBLICATIONS

Indian Office Action dated Mar. 14, 2023, issued in Indian Patent Application No. 202141021672.
(Continued)

*Primary Examiner* — Barry W Taylor
(74) *Attorney, Agent, or Firm* — Jefferson IP Law, LLP

(57) ABSTRACT

A method performed by a user equipment (UE) and a UE for managing cell selection in a cellular network based on early measurement feature is provided. The method includes detecting that a signal strength of a first cell to which the UE is connected is below at least one threshold parameter, identifying a plurality of secondary cells, in the vicinity of the UE, having signal strengths greater than the at least one threshold parameter and supporting early measurement features, wherein the plurality of the secondary cells include at least one New Radio (NR) cell, and selecting the at least one NR cell from the identified plurality of secondary cells for connecting to the cellular network.

20 Claims, 10 Drawing Sheets

(56) References Cited

U.S. PATENT DOCUMENTS

| | | | |
|---|---|---|---|
| 2016/0269888 A1* | 9/2016 | Ljung | H04W 48/16 |
| 2018/0359683 A1 | 12/2018 | Rosa et al. | |
| 2019/0150014 A1 | 5/2019 | Vertej et al. | |
| 2020/0008116 A1 | 1/2020 | Zhang et al. | |
| 2020/0187070 A1 | 6/2020 | Wang et al. | |
| 2020/0260308 A1 | 8/2020 | Jin et al. | |
| 2021/0006981 A1 | 1/2021 | Van Der Velde | |
| 2021/0007000 A1 | 1/2021 | Kim et al. | |
| 2022/0046747 A1* | 2/2022 | Da Silva | H04W 52/0229 |
| 2022/0151000 A1* | 5/2022 | Virtej | H04L 5/0051 |
| 2022/0191779 A1* | 6/2022 | Bergqvist | H04W 24/10 |
| 2022/0248277 A1* | 8/2022 | Cheng | H04W 36/0058 |
| 2023/0102264 A1* | 3/2023 | Hu | H04L 5/0048 370/331 |
| 2024/0276271 A1* | 8/2024 | Sabouri-Sichani | H04W 24/10 |

FOREIGN PATENT DOCUMENTS

| | | |
|---|---|---|
| EP | 3 567 917 A1 | 11/2019 |
| WO | 2016/082028 A1 | 6/2016 |
| WO | 2018/128529 A1 | 7/2018 |
| WO | 2019/197711 A1 | 10/2019 |
| WO | 2020/162811 A1 | 8/2020 |
| WO | 2020/167182 A1 | 8/2020 |
| WO | 2020/193789 A1 | 10/2020 |
| WO | 2021/076028 A1 | 4/2021 |

OTHER PUBLICATIONS

International Search report dated Aug. 10, 2022, issued in an International Application No. PCT/KR2022/006741.
Ericsson, Analysis of MR-DC enhancement agreements on early measurement reporting, 3GPP Draft, R4-1909462, 3GPP TSG-RAN WG4 Meeting #92, Aug. 16, 2019, XP015772342.
Extended European Search Report dated Jun. 7, 2024, issued in European Patent Application No. 22807835.8.

* cited by examiner

METHOD AND SYSTEM FOR MANAGING CELL SELECTION IN A CELLULAR NETWORK BASED ON EARLY-MEASUREMENT FEATURE

CROSS-REFERENCE TO RELATED APPLICATION(S)

This application is a continuation application, claiming priority under § 365(c), of an International application No. PCT/KR2022/006741, filed on May 11, 2022, which is based on and claims the benefit of an Indian Provisional patent application number 202141021672, filed on May 13, 2021, in the Indian Intellectual Property Office, and of an Indian Complete patent application number 202141021672, filed on Apr. 28, 2022, in the Indian Intellectual Property Office, the disclosure of each of which is incorporated by reference in herein in its entirety.

TECHNICAL FIELD

The disclosure relates to an early measurement feature for improved Carrier Aggregation (CA)/Dual Connectivity (DC) setup. More particularly, the disclosure relates to a method and a system for managing cell selection in a cellular network based on early measurement features.

BACKGROUND

In current $5^{th}$ Generation (5G) scenarios, demand for larger bandwidth associated with data transfer operations by a User Equipment (UE) is growing day by day. Utilizing Carrier Aggregation (CA) and Dual Connectivity (DC) combined configuration setup, the UE is connected to two base stations and utilizes multiple cells in each of them, thereby significantly increasing the maximum bandwidth for the UE. Particularly, by virtue of the DC configuration setup, the UE is simultaneously connected to the two serving base stations such as a Master Node (MN), and a Secondary Node (SN), and by virtue of the CA configuration setup. The UE is simultaneously connected with multiple cells of each of the serving base stations so that the UE is capable to operate at multiple frequencies at the same time.

There are various deployment scenarios/features which are used to boost the peak data rates transfer like DC (for example, New Radio (NR) DC, NR-Evolved Universal Mobile Telecommunications System Terrestrial Radio Access Network (EUTRA) DC and so on) and CA (for example, NR-CA, Long-Term Evolution (LTE)-CA and so on). However, all these deployment scenarios are based on tight network coordination and the availability of UE information like UE measurement reporting. UE does not always transmit or receive data to and from a Radio Access Network (RAN), instead, the UE remains in an IDLE state or INACTIVE state to reduce signaling and energy consumption. If the UE receives a high data volume request in the idle state or inactive state, then UE changes from an IDLE/INACTIVE state to a connected state. After receiving the request, a Radio Resource Control (RRC) connection is established prior to configuring a Secondary cell (Scell) or a Secondary Cell Group (SCG) where it takes around 30 ms to 1 sec more for the network configuration. Consequently, the signaling procedure introduces a delay in CA and/or DC configuration setup, which limits the utilization of larger bandwidths for the UEs. Hence, to resolve the aforesaid problem and to ensure faster setup/reconfiguration of CA/DC, an early Measurement feature is introduced in $3^{rd}$ Generation Partnership Project (3GPP) Release-16.

Early measurement feature ensures early and fast reporting of measurements information availability from a neighbor and serving cells in IDLE/INACTIVE mode to reduce delay for addition or activation of SCell or SCG in case of Multi-RAT (MR)-DC and/or MR-CA set up.

If the early measurement feature is enabled, the UE sends the SCell measurement report immediately after the RRC connection, and the RAN adds and activates the SCells immediately. Thus, UE in IDLE state, IDLE with suspended state or INACTIVE state is configured with New Radio (NR) early measurements to support fast setup of EN-DC that is enhanced utilization of CA (euCA) is extended to support NR measurements. To accelerate secondary cell addition procedure, it is desirable that the UE camps on NR cells which supports early measurement features.

The above information is presented as background information only to assist with an understanding of the disclosure. No determination has been made, and no assertion is made, as to whether any of the above might be applicable as prior art with regard to the disclosure.

SUMMARY

The disclosure is directed to overcome one or more limitations stated above or any other limitation associated with the conventional arts.

Aspects of the disclosure are to address at least the above-mentioned problems and/or disadvantages and to provide at least the advantages described below. Accordingly, an aspect of the disclosure is to provide a method and a system for managing cell selection in a cellular network based on early measurement features.

Additional aspects will be set forth in part in the description which follows and, in part, will be apparent from the description, or may be learned by practice of the presented embodiments.

In accordance with an aspect of the disclosure, a method for managing cell selection by a user equipment (UE) in a cellular network based on early measurement features is provided. The method comprises detecting that a signal strength of a first cell to which the UE is connected is below at least one threshold parameter, identifying a plurality of secondary cells, in the vicinity of the UE, having signal strengths greater than the at least one threshold parameter and supporting early measurement features, wherein the plurality of secondary cells include at least one New Radio (NR) cell, and selecting the at least one NR cell from the identified plurality of secondary cells for connecting to the cellular network.

In accordance with another aspect of the disclosure, a UE for managing cell selection in a cellular network based on early measurement features is provided. The UE comprises at least one processor configured to detect that a signal strength of a first cell to which the UE is connected is below at least one threshold parameter, identify a plurality of secondary cells, in the vicinity of the UE, that have signal strengths greater than the at least one threshold parameter and support early measurement features, wherein the plurality of secondary cells include at least one New Radio (NR), and select the at least one NR cell from the identified plurality of secondary cells for connecting to the cellular network.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE
ACCOMPANYING DRAWINGS

The above and other aspects, features and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
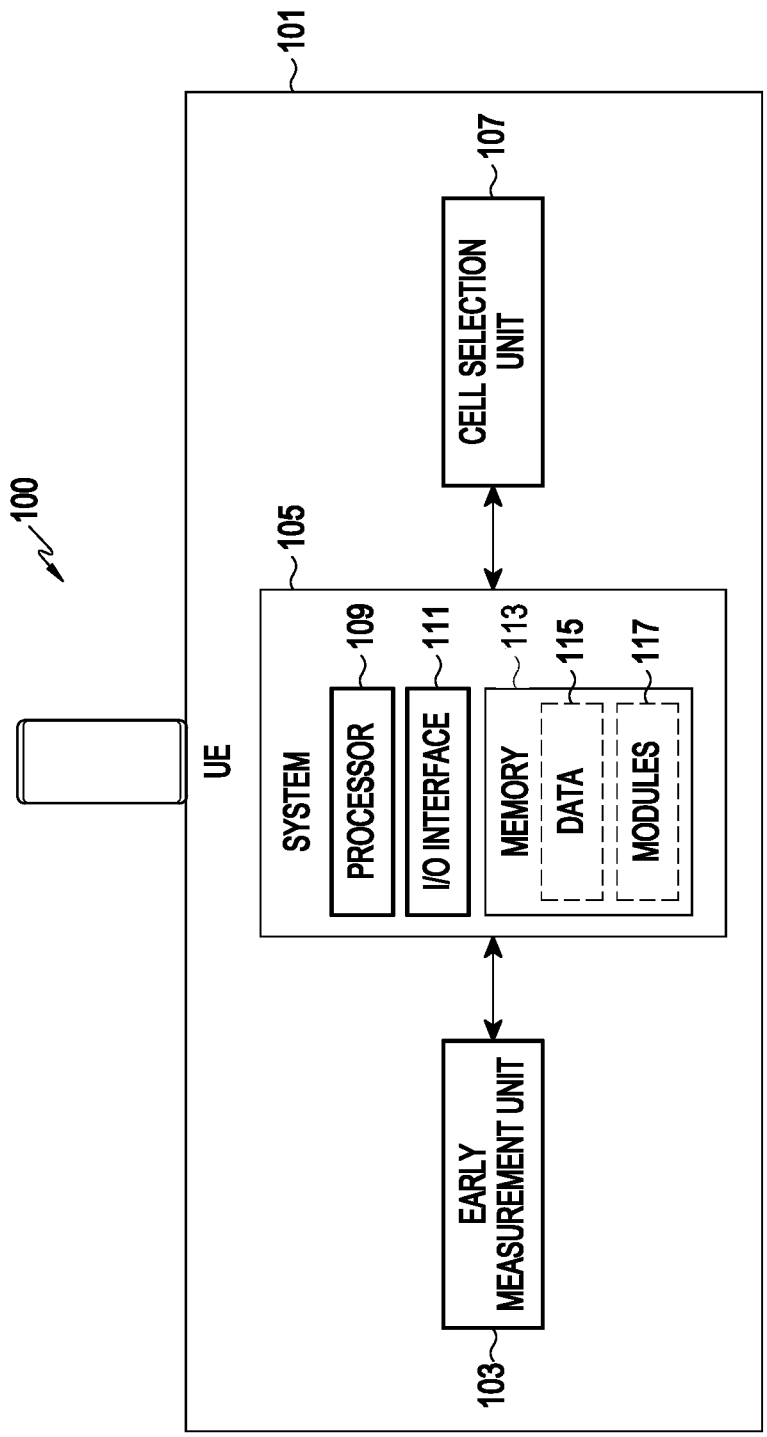
FIG. 1 shows an overview of a UE for managing cell selection in a cellular network based on early measurement feature according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the specific forms disclosed, but on the contrary, the disclosure is to cover all modifications, equivalents, and alternative falling within the scope of the disclosure.

The terms "comprise", "comprising", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The terms "include", "including", or any other variations thereof, are intended to cover a non-exclusive inclusion, such that a setup, device, or method that includes a list of components or steps does not include only those components or steps but may include other components or steps not expressly listed or inherent to such setup or device or method. In other words, one or more elements in a system or apparatus proceeded by "includes . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the disclosure. The following description is, therefore, not to be taken in a limiting sense.

The disclosure relates to a method and a system for managing cell selection in a cellular network based on early measurement feature. Initially, the system enables the UE to prioritize New Radio (NR) cells and Long-Term Evolution (LTE) cells supporting early measurement feature over other cells which do not support early measurement feature in a Public Land Mobile Network (PLMN) area associated with the UE. At this point, the UE generates a modified Most Recently Used (MRU) frequencies list which supports the early measurement feature for each frequency in the MRU list based on Information Elements (IEs) which are broadcasted by a network. Utilizing the modified MRU list, the UE performs MRU frequency scan during cell selection event and cell redirection event. Also, the UE performs full band scan considering whether identified cell supports early measurement feature or not, during the cell selection event and the cell redirection event. Further, the UE generates a list of prioritized candidate cells based on early measurement feature for cell reselection event and Inter-RAT/Intra-RAT handover event. The list of prioritized candidate cells is utilized to prioritize sending measurement report for candidate cells supporting the early measurement feature. The suitability of the candidate cells is determined in the disclosure based on predetermined parameters such as, but not limiting to, CA/DC capable frequencies, UE capability, operator deployment parameters such as Bandwidth and theoretical throughput In this manner, the disclosure provides helps the UEs in prioritizing the candidate cells and camp on the cells supporting the early measurement feature. Further, the user is facilitated with better 5G throughput and overall 5G experience of the user is enhanced.

FIG. 1 shows an overview of a UE for managing cell selection in a cellular network based on early measurement features according to an embodiment of the disclosure.

In an embodiment of the disclosure, an environment 100 may include, a UE 101, comprises, without limiting to, an early measurement unit 103, a system 105 and a cell selection unit 107. The early measurement unit 103 comprises identifying early measurement features support of the Network based on Information Elements (IEs) which are broadcasted by a network. A cell selection unit 107 comprises selecting and camping on a cell and storing camped cell data based on early measurement features. The system 105 comprises a processor 109, an I/O Interface 111 and a memory 113. The processor 109 may be interfaced with the memory 113 and configured for performing one or more functions of the system 105 while managing cell selection in a cellular network based on early measurement features. The I/O Interface 111 may be configured for receiving one or more user inputs for prioritizing New Radio (NR) cells supporting early measurement feature images of a scene from the image capturing unit of the UE 101. The memory 113 may also store data 115 and modules 117 of the system 105.

In an embodiment of the disclosure, UE 101 may identify NR cell in the environment which is below a threshold parameter, wherein the threshold parameters are signal parameters and cell parameters. Initially, the system 105 identifies a plurality of secondary cells, within the vicinity of the UE 101, containing at least a NR cell with signal strengths greater than the threshold parameter and having early measurement features. Thereafter, the UE 101 may prioritize the plurality of secondary cells over other secondary cells without early measurement features. Each frequency in the MRU frequencies list is tagged based on IEs such as idleModeMeasurementsEUTRA and idleModeMeasurementsNR in NR System Information Block 1 (SIB1), and, idleModeMeasurements and idleModeMeasurementsNR in Long Term Evolution (LTE) SIB2 messages broadcasted by the network.

In an embodiment of the disclosure, the UE 101 may select/reselect/handover/redirect to NR/LTE cell supporting early measurement feature in an overlapping area based on NR SIB1 parameters (idleModeMeasurementsNR and idleModeMeasurementsEUTRA) or LTE SIB2 parameters (idleModeMeasurementsNR and idleModeMeasurements). Thereafter, for NR cell selection utilizing a full band scan, the system 105 may prefer the NR cells supporting early measurement feature for camping over other NR cells not supporting early measurement feature. Further, for performing cell reselection, the system may generate a list of prioritized candidate cells based on early measurement features. Similarly, during performing measurement event associated with Inter-RAT/Intra-RAT redirection, the system 105 may perform the MRU frequency scan. The MRU frequency scan may utilize the modified MRU frequency list based on the early measurement feature if redirected NR frequency is not provided to the UE 101 from the network. Alternatively, if the UE 101 does not find any MRU frequency supporting the early measurement feature, then UE 101 may trigger a full band scan based on the early measurement feature. However, if the network has redirected a specific NR Frequency to the UE 101, then the UE 101 may trigger searching for NR cells supporting the early measurement feature associated with the redirected frequency. For performing Inter-RAT/Intra-RAT handover in connected mode, the UE 101 may generate a list of prioritized candidate cells satisfying the inter-RAT/intra-RAT measurement event criteria based on the early measurement features. The UE 101 may send a measurement report for the NR cells satisfying the Inter-RAT/Intra-RAT measurement event criteria (for example, A3 measurement event and A5 measurement event) with early measurement feature first and later may send the measurement report for the cells satisfying the Inter-RAT/Intra-RAT measurement event criteria without early measurement feature.

Figure 2:
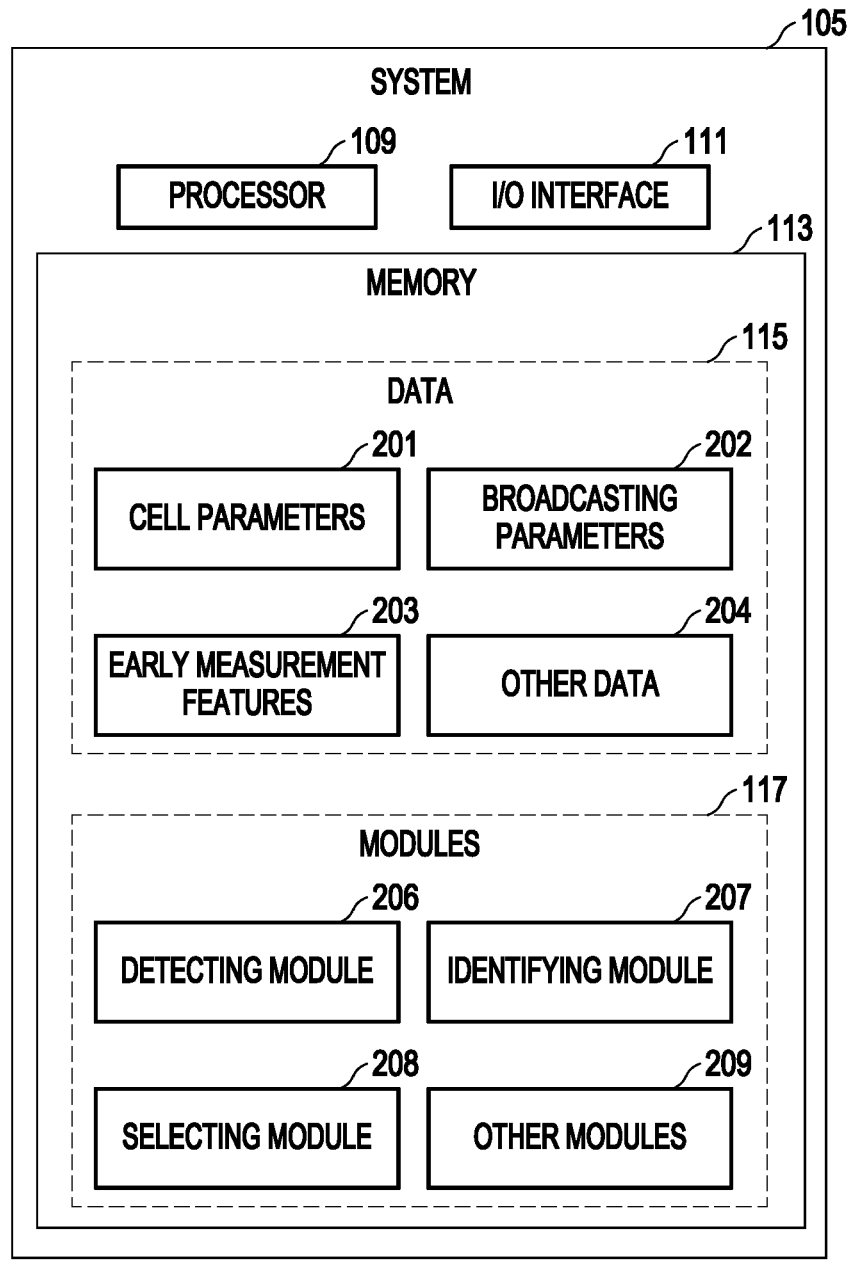
FIG. 2 shows a detailed block diagram of a system within the UE for managing cell selection in a cellular network based on early measurement feature according to an embodiment of the disclosure.

FIG. 2 shows a detailed block diagram of a system 105 within the UE for managing cell selection in a cellular network based on early measurement feature according to an embodiment of the disclosure.

In an embodiment of the disclosure, the system 105 receives data 115 through the I/O interface 111. The received data 115 is stored within the memory 113. In an embodiment of the disclosure, the data 115 stored in the memory 113 may include, without limiting to, data 115 related to a cell parameters 201, a broadcasting parameter 202, an early measurement features 203, and other data 204 associated with the system 105.

In an embodiment of the disclosure, the data 115 may be stored in memory 113 in the form of various data structures. Additionally, the data 115 can be organized using data models, such as relational or hierarchical data models. The other data 204 may store data, including various temporary data and temporary files, generated by modules 117 for performing the various functions of the system 105. As an example, the other data 204 may include, without limitation, temporarily stored previous input data or stored data collected from the early measurement unit 103.

In an embodiment of the disclosure, the cell parameters 201 comprises information related to one or more NR cells or LTE cells in a Public Land Mobile Network (PLMN) area associated with the UE 101. Cell parameters 201 may also comprise cell signal parameters such as Reference Signal Received Power (RSRP), Reference Signal Received Quality (RSRQ), Signal-to-Noise Ratio (SINR), and so on. The UE 101 may configure and maintain a threshold parameter based on cell signal parameters. Further, the threshold parameters are decided based on network topology/deployment (for example, set the threshold parameter ranging from 5 dBm to 10 dBm) to make sure the UE 101 doesn't ping pong between the candidate cells having similar signal conditions within the same area.

In an embodiment of the disclosure, the broadcasting parameters 202 comprises one or more broadcasted messages in NR SIB1 parameters and LTE SIB2 parameters, wherein NR SIB1 parameters are idleModeMeasurementsNR and idleModeMeasurementsEUTRA and LTE SIB2 parameters are idleModeMeasurementsNR and idleModeMeasurements.

In an embodiment of the disclosure, the broadcasted message idleModeMeasurementsEUTRA in NR SIB1 and idleModeMeasurements in LTE SIB2 indicates that the UE 101 is configured for Evolved Universal Mobile Telecommunications System (EUTRA) IDLE/INACTIVE measurements may perform the measurements while camping in an identified cell. Thereafter, report the availability of IDLE/INACTIVE measurements when establishing or resuming a connection in the identified cell. A UE 101 is not required to perform EUTRA IDLE/INACTIVE measurements if a connection is not present. The broadcasted message idleModeMeasurementsNR in NR SIB1 and idleModeMeasurementsNR in LTE SIB2 indicates that the UE 101 is configured for NR IDLE/INACTIVE measurements intend to perform the measurements while camping in an identified cell. Thereafter, report the availability of IDLE/INACTIVE measurements when establishing or resuming a connection in the identified cell. If a connection is not present, then the UE 101 is not required to perform NR IDLE/INACTIVE measurements.

In an embodiment of the disclosure, the early measurement features 203 comprises data related to supporting early measurement features which are determined by Carrier Aggregation (CA)/Dual Connectivity (DC) capable frequencies as per the UE 101 capability (like CA, EN-DC, MR-DC, NG(EN)-DC). For example, UE 101 generates a list of prioritized candidate cells based on the early measurement feature, wherein the prioritization of candidate cell is based on maximum achievable throughput as per UE 101 capability and operator bandwidth/deployment scenario of the selected cell/frequency while using Scell/SCG/DC on identified cell.

In an embodiment of the disclosure, the data 115 stored in memory 113 may be processed by one or more modules 117 of the system 105 within the UE 101. The modules 117 may be stored within the memory 113 as shown in FIG. 2. In an embodiment, the one or more modules 117 may be implemented as dedicated hardware units and when implemented in such a manner, said modules 117 may be configured with the functionality defined in the disclosure to result in a novel hardware. As used herein, the term module may refer to an Application Specific Integrated Circuit (ASIC), an electronic circuit, a Field-Programmable Gate Arrays (FPGA), Programmable System-on-Chip (PSoC), a combinational logic circuit, and/or other suitable components that provide the described functionality. In an example, the modules 117, communicatively coupled to the processor 109, may also be present outside the memory 113.

In one implementation, the modules 117 may include, for example, a detecting module 206, an identifying module 207, a selecting module 208, and other modules 209. The other modules 209 may be used to perform various miscellaneous functionalities of the system 105. It will be appreciated that such aforementioned modules 117 may be represented as a single module or a combination of different modules 117.

In an embodiment of the disclosure, the detecting module 208 may be configured to detect a signal strength of the UE 101 connected to a first cell to be below a threshold parameter. The threshold parameters are signal parameters and cell parameters (such as RSRP, RSRQ, SINR, and so on).

In an embodiment of the disclosure, the identifying module 209 may be configured to identify a plurality of secondary cells containing signal strengths greater than the threshold parameter and having early measurement features which are present within the vicinity of the UE 101. The identifying module 209 is further configured to execute a scanning mechanism across a Most Recently Used (MRU) frequencies list which supports the early measurement feature. As an MRU frequency, cells from the plurality of secondary cells with early measurement features are prioritized over secondary cells without early measurement features. The early measurement features are determined based on Information Elements (IEs) which are broadcasted by a network.

In an embodiment of the disclosure, the selecting module 210 may be configured to select a New Radio (NR) cell from the identified plurality of secondary cells for connecting to a cellular network. Further, the selecting the NR cell by UE 101 during cell selection using MRU frequencies, NR cell selection using full band scan, NR cell reselection, network redirection, and connected mode handover.

Figure 3:
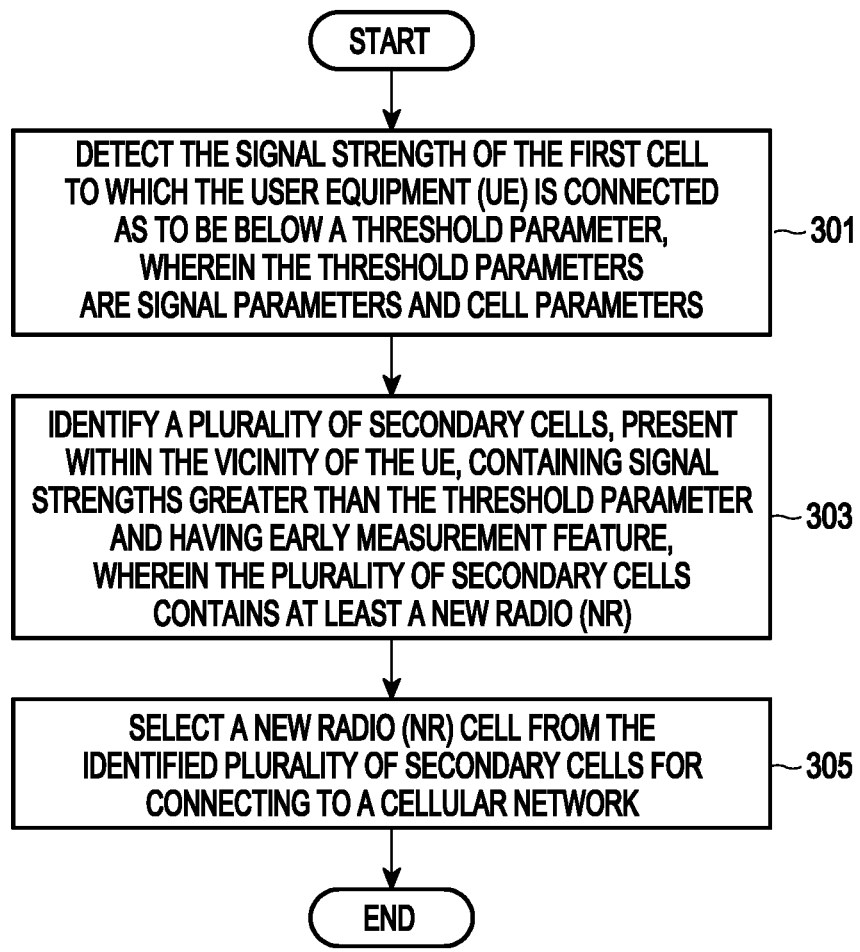
FIG. 3 is a flow diagram showing a method for managing cell selection in a cellular network based on early measurement feature according to an embodiment of the disclosure.

FIG. 3 is a flow diagram showing a method for managing cell selection in a cellular network based on early measurement feature according to an embodiment of the disclosure.

As illustrated in FIG. 3, the method comprises one or more blocks for managing cell selection in a cellular network based on early measurement feature by a UE 101. The method may be described in the general context of computer executable instructions. Generally, computer executable instructions can include routines, programs, objects, components, data structures, procedures, modules, and functions, which perform particular functions or implement particular abstract data types.

The order in which the method is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 301, the method comprises detecting, by a UE 101, signal strength of the first cell to which the User Equipment (UE) 101 is connected as to be below a threshold parameter, wherein the threshold parameters are signal parameters and cell parameters. As an example, detecting the signal strength of the UE 101 when connected to one or more cells 401 (for example, a cell A $401_1$, a cell B $401_2$ and a cell C $401_3$).

At block 303, the method comprises identifying, by the UE 101, a plurality of secondary cells, present within the vicinity of the UE 101 containing signal strengths greater than the threshold parameter and having early measurement feature. Identifying the plurality of secondary cells further comprises executing a scanning mechanism across MRU frequencies list which supports the early measurement feature. As a Most Recently Used (MRU) frequency, cells from a plurality of secondary cells with early measurement features are preferred over secondary cells without early measurement features.

At block 305, the method comprises selecting, by the UE 101, a New Radio (NR) cell from the identified plurality of secondary cells containing at least a NR Cell for connecting to a cellular network. The selection of the NR cell by UE is based on cell selection using MRU frequencies, NR cell selection using full band scan, NR cell reselection, network redirection, and connected mode handover. If multiple candidate cells supporting early measurement feature are available in case of cell selection or reselection or handover or during any camping procedure, then UE may select the highest priority cell among these multiple candidate cells.

Figure 4:
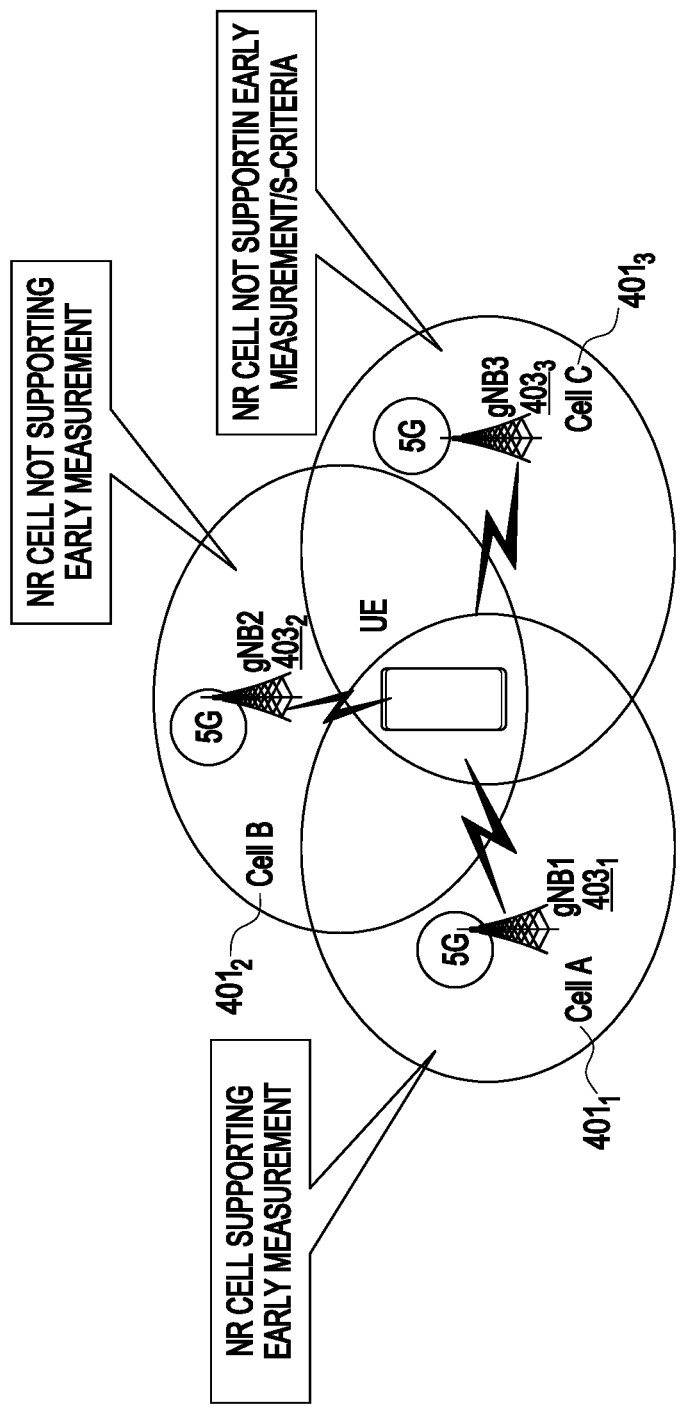
FIG. 4 illustrates a scenario for identifying candidate NR cell in a 5G environment based on early measurement features according to an embodiment of the disclosure.

FIG. 4 illustrates a scenario for identifying candidate NR cell in a 5G environment based on early measurement features according to an embodiment of the disclosure.

FIG. 4 illustrates a scenario for identifying candidate NR/LTE cells in a PLMN area based on early measurement feature. Here, a UE 101 may identify three NR/LTE cells 401 such as cell A 401$_1$, cell B 401$_2$ and cell C 401$_3$ in a PLMN area. As an example, the cell A 401$_1$, cell B 401$_2$ and cell C 401$_3$ may be served by NR/LTE base stations 403$_1$, 403$_2$ and 403$_3$, respectively. The cell B 401$_2$ may be a best suitable cell as per 3GPP specification defined criteria, followed by the cell A 401$_1$. However, the cell B 401$_2$ may not support early measurement feature as compared to the cell A 401$_1$ which supports the early measurement feature. The cell C 401$_3$ may not satisfy S-criteria and may not support the early measurement feature as well as not a candidate cell for UE 101. Hence, the cell C 401$_3$ may not be considered as a suitable cell by the UE 101. As opposed to conventional method, the UE 101 may select the cell A 401$_1$ for camping, since the cell A 401$_1$ supports the early measurement feature. Consequently, the UE 101 may be able to take advantage of the early measurement feature for fast CA/DC configuration in the same environment which may improve the 5G user experience.

Figure 5:
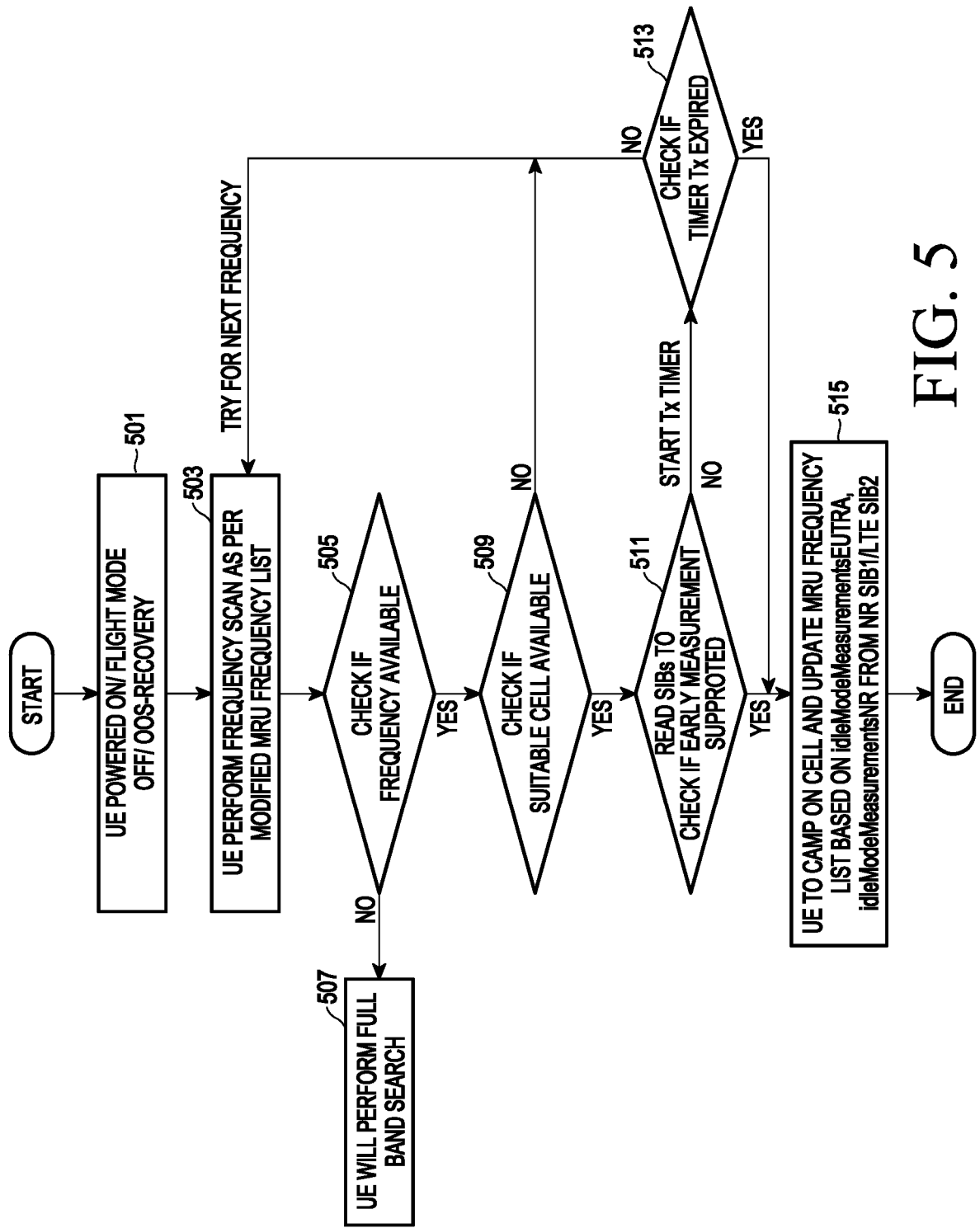
FIG. 5 illustrate a flowchart illustrating a method of identifying candidate NR cell based on early measurement feature for NR cell selection using stored Most Recently Used (MRU) frequencies according to an embodiment of the disclosure.

FIG. 5 is a flowchart illustrating a method of identifying candidate NR cell based on early measurement feature for NR cell selection using stored Most Recently Used (MRU) frequencies according to an embodiment of the disclosure.

In an embodiment of the disclosure, identifying candidate NR cell in 5G environment based on early measurement feature for NR cell selection using MRU frequencies stored in the UE 101 is illustrated in FIG. 5. Particularly, during power-on, flight mode on/off, reboot, or OOS-Recovery in operation 501, the UE 101 may first trigger a scan for MRU NR frequencies (as shown in Table 1 below) to select a candidate cell for camping in operation 503. Thereafter, the UE 101 may generate a modified MRU frequency list with a tag indicating whether each of the NR frequency present in the MRU frequency list, supports the early measurement feature as presented in Table 2 below. The value of the tag for each of the NR frequency present in the MRU frequency list may be set based on IEs broadcasted by a gNB 403. The IEs may be broadcasted in NR SIB1 message by the gNB 403. The IEs for early measurement of the NR cells may include idleModeMeasurementsEUTRA and idleModeMeasurementsNR. As presented in Table 2, for the NR frequency which supports the early measurement feature, corresponding tag value may be set as "Yes". Similarly, for the NR frequency which does not support the early measurement feature, corresponding tag value may be set as "No". Further, storing early measurement feature support for each MRU frequency as per NR SIB1 parameters and prioritizing MRU frequencies which supports the early measurement feature.

TABLE 1

| Cell ID | NR frequency | Early Measurement Support |
|---------|--------------|---------------------------|
| 1 | F1 | No |
| 2 | F2 | No |
| 3 | F3 | Yes |
| 4 | F4 | Yes |

TABLE 2

| Cell ID | NR frequency | Early Measurement Support (Tag Value) |
|---------|--------------|---------------------------------------|
| 1 | F3 | Yes |
| 2 | F4 | Yes |
| 3 | F1 | No |
| 4 | F2 | No |

In an embodiment of the disclosure, the modified MRU frequency list, the NR frequencies (for example, F1, F2, F3, F4) with the tag value of "Yes" may have a higher priority in comparison to other NR frequencies with the tag value of "No". In case of multiple NR frequencies in the modified MRU frequency list with the tag value as "Yes", the UE 101 may prioritize CA/DC capable NR frequencies as per UE's 101 capability. As an example, for camping, the UE 101 may prioritize a NR cell corresponding to the NR frequency F3 and F4 supporting the early measurement feature over a NR cell corresponding to the NR frequency F1 and F2 not supporting the early measurement feature. Further, UE 101 camp on identified NR cell say cell ID 3, NR frequency F3 with early measurement support and may update the modified MRU frequency list accordingly.

In another embodiment of the disclosure, if the UE 101 determines that the identified NR cell does not support early measurement feature in operation 511, then UE 101 may identify a new NR cell for a first predetermined time in operation 513. For example, the UE 101 may start a timer (Tx) with a predetermined duration and may search for a next suitable NR cell which supports early measurement feature within expiry of the timer. The duration of the timer may be configurable by the UE 101. The duration of timer may be set to identify a NR cell supporting an early measurement feature without affecting camping experience of the UE 101. Upon identifying the NR cell supporting early measurement feature in operation 511, the UE 101 may stop the timer and may select the identified NR cell as candidate cell for camping in operation 515. However, if the UE 101 does not find any NR cell supporting early measurement, it may continue with selected suitable NR cell for camping.

Figure 6:
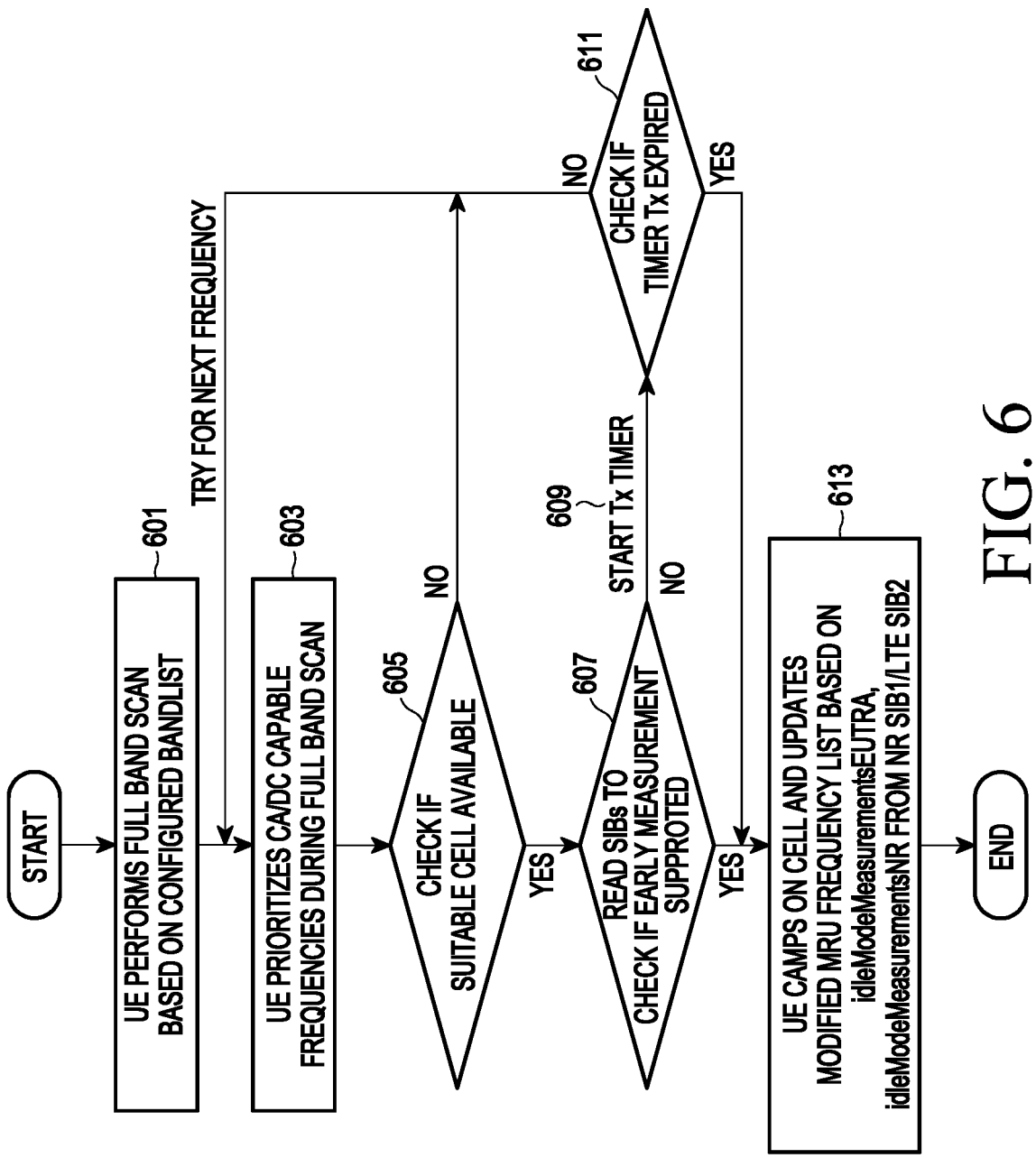
FIG. 6 illustrate a flowchart illustrating a method of identifying candidate NR cell based on early measurement feature for NR cell selection using a full band scan according to an embodiment of the disclosure.

In another embodiment of the disclosure, if the UE 101 does not find any suitable cell during NR MRU frequency scan in operation 505, the UE 101 may perform operation 507 to trigger a NR full band scan as per UE's supported band list as discussed in explanation of FIG. 6. In the disclosure, prioritizing the NR cell supporting early measurement feature during MRU frequency scan, may reduce time delay associated with the CA/DC setup when the UE 101 starts camping on the NR cell, which accelerates data transfer leading to better user experience.

FIG. 6 illustrate a flowchart illustrating a method of identifying candidate NR cell based on early measurement feature for NR cell selection using a full band scan according to an embodiment of the disclosure.

In an embodiment of the disclosure, if the UE 101 does not find any suitable cell during NR MRU Frequency scan in operation 505 in FIG. 5, then the UE 101 may trigger the NR full band scan as per the supported band list in UE 101 in operation 507 in FIG. 5 and corresponding operation 601 in FIG. 6. Initially, the UE 101 may prioritize CA/DC capable NR frequencies to optimize the full band scan in operation 603. Once the UE 101 identifies a suitable NR cell during the NR full band scan in operation 509 and FIG. 5 and operation 605 in FIG. 6, the UE 101 may determine the early measurement feature for the identified suitable cell by reading NR SIB1 message such as idleModeMeasurementsEUTRA and idleModeMeasurementsNR in operation 515 in FIG. 5 and in operations 607 and 613 in FIG. 6. The NR SIB1 message may indicate that whether the identified suitable NR cell supports the early measurement feature or not. If the UE 101 determines that the identified suitable NR cell does not support early measurement feature in operation 607, then the UE 101 may start a timer with a predetermined duration (Tx) and may search for a next suitable cell supporting early measurement feature within the expiry of the timer in operation 609. The duration of the timer may be configurable. The duration of timer may be set to identify a suitable NR cell supporting early measurement feature without affecting camping experience of the UE 101. Upon identifying a suitable NR cell supporting early measurement feature before expiry of the timer, the UE 101 may stop the timer and may select the suitable NR cell as candidate cell for camping. Further, the UE 101 may update the modified MRU frequency list as per early measurement support of the camped cell based on the IEs broadcasted by the gNB 403 in the NR SIB1. However, during the NR full band scan, if the UE 101 doesn't find any suitable cell supporting early measurement feature before the expiry of the time in operation 611, then the UE 101 may stop the timer and camp on the best identified cell found before the expiry of the timer irrespective of early measurement feature.

As an example, in a network, available cells may include a first cell with Cell ID 1 and a NR frequency F1, a second cell with Cell ID 2 and a NR frequency F2, third cell with Cell ID 3 and a NR frequency F3, and a fourth cell with cell ID 4 and a NR frequency F4 (as shown in Table 1). During the NR full band scan, the UE 101 may scan the NR frequency F1 to check if any suitable cells corresponding to the NR frequency F1 are available. During scanning the NR frequency F1, the UE 101 may determine that the first cell does not support the early measurement feature. After determining the secondary cell, the UE 101 may start the timer. Further, the UE 101 may scan the next NR frequency F2 to check if any suitable cells corresponding to the NR frequency F2 supports the early measurement feature before expiry of the timer. During scanning the NR frequency F2, the UE 101 may determine that the second cell also doesn't support the early measurement feature. Upon determining the secondary cell, the UE 101 may verify whether the timer has expired or not. If the timer has not expired, the UE 101 may scan the next NR frequency F3 to check if any suitable cells corresponding to the NR frequency F3 are available supporting the early measurement feature before expiry of the timer. During scanning the NR frequency F3, the UE 101 may identify the third cell with Cell ID 3 as a suitable cell and may determine that the third cell supports the early measurement feature. Upon determining this, the UE 101 may stop the timer voluntarily and may camp on the third cell supporting the early measurement feature as shown in Table 3. However, if the UE 101 fails to identify a suitable cell supporting the early measurement feature before expiry of the timer, then the UE 101 may determine a best suitable cell among the identified suitable cells say Cell ID 3 and Cell ID 4. Upon determining that the Cell ID 4 as the best suitable cell, the UE 101 may initiate camping on the fourth cell.

TABLE 3

| Cell ID | NR frequency |
|---------|--------------|
| 1 | F1 |
| 2 | F3 |
| 3 | F2 |
| 4 | F4 |

In an embodiment of the disclosure, a first predetermined time may initiate (timer Tx) may be set by the UE 101, when a first suitable cell is identified which does not support the early measurement feature (for example, Cell ID 1). Further, the timer may be voluntarily stopped by the UE 101, if a second suitable cell supporting the early measurement feature is identified for camping (for example, Cell ID 3). Alternatively, if the timer expires before identifying a suitable cell supporting the early measurement feature, the UE 101 may select a best suitable cell among the identified suitable cells (for example, one of the Cell ID 3 or Cell ID 4) for camping. Further, prioritizing the NR cell supporting early measurement feature during the NR full band scan, may reduce the time delay associated with the CA/DC setup when the UE 101 starts camping on the NR cell, which accelerates data transfer leading to a better user experience.

Figure 7:
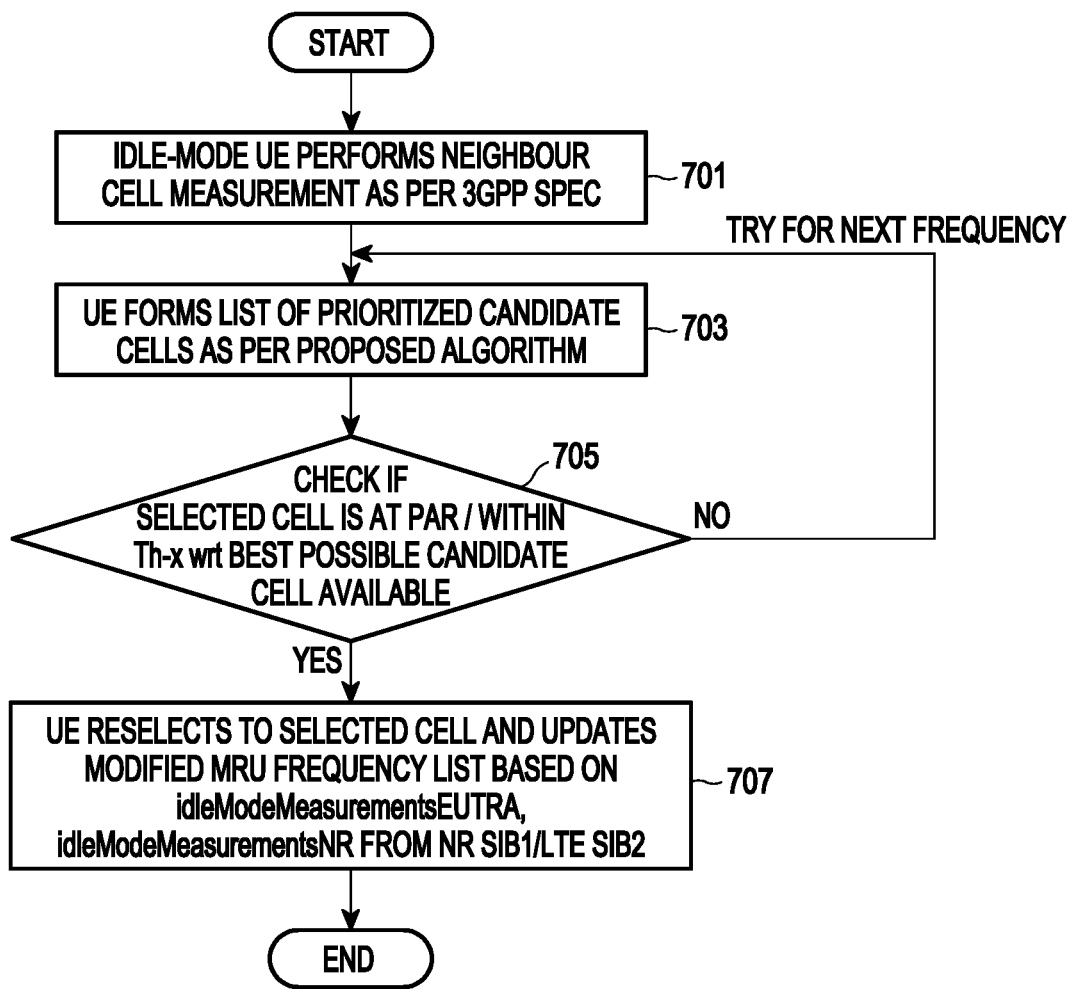
FIG. 7 illustrate a flowchart illustrating a method of identifying candidate NR cell based on early measurement feature for NR cell reselection using a full band scan according to an embodiment of the disclosure.

FIG. 7 illustrate a flowchart illustrating a method of identifying candidate NR cell based on early measurement feature for NR cell reselection using a full band scan according to an embodiment of the disclosure.

In an embodiment of the disclosure, the UE 101, which is in IDLE state may perform neighbor cell measurement according to the 3GPP specification in operation 701. The UE 101 may generate a "list of prioritized candidate cells" in operation 703 based on early measurement feature, in which priority of multiple candidate cells supporting early measurement feature is decided based on predetermined parameters. The predetermined parameters may include, but not limited to CA/DC capable frequencies as per UE's capability, Scell/SCG/MRDC maximum achievable throughput supported by the NR cell, cell/signal parameters, and 3GPP reselection priority. The may UE 101 may check candidate cells in the generated list of prioritized candidate cells one by one from higher priority to lower priority. Further, the UE 101 may determine that if the selected candidate cell is either at par with the best possible candidate cell as per 3GPP specification for cell reselection or should not be inferior to the best possible candidate cell as per 3GPP specification for cell reselection by more than a predetermined threshold parameter value (say Th-x) in operation 705. If the candidate cell satisfies the criteria, the UE 101 may reselect to the selected candidate cell in priority order, from the list of prioritized candidate cells in operation 707. Thereafter, the UE 101 may update the modified MRU frequency list as per early measurement support of the camped cell based on the IEs such as idleModeMeasurementsEUTRA, and idleModeMeasurementsNR, broadcasted by the gNB 403 in the NR SIB 1. However, if the candidate cell does not satisfy the criteria in operation 705, the UE 101 may repeat the process for a next candidate cells until the UE 101 either reselects to a candidate cell supporting early measurement feature which has higher priority as compared to priority of a best candidate cell identified as per 3GPP specification or UE 101 reaches the entry of 3GPP defined best candidate cell in the list of prioritized candidate cells.

As an example, in a network area, available cells may include a first cell with Cell ID 1 and a NR frequency F1, a second cell with Cell ID 2 and a NR frequency F2, third cell with Cell ID 3 and a NR frequency F3, and a fourth cell with cell ID 4 and a NR frequency F4. Initially, in the list of prioritized candidate cells, the priority of the first cell, the second cell, the third cell and the fourth cell may be set as 1, 2, 3 and 4 respectively in descending order (from highest priority to lowest priority) as per 3GPP reselection priority shown in Table 4. Among these cells, the UE 101 may determine that the third cell and the fourth cell supports the early measurement feature, and the first cell and the second cell does not support the early measurement feature. After determining the suitable cells, the UE 101 may set the priority of the first cell, the second cell, the third cell and the fourth cell as 3, 4, 1 and 2 respectively in the list of prioritized candidate cells as illustrated below in Table 5.

TABLE 4

| Priority | Cell ID | NR Frequency | Early Measurement Support (Tag value) |
| --- | --- | --- | --- |
| 1 | 1 | F1 | No |
| 2 | 2 | F2 | No |
| 3 | 3 | F3 | Yes |
| 4 | 4 | F4 | Yes |

TABLE 5

| Priority | Cell ID | NR Frequency | Early Measurement Support (Tag value) |
| --- | --- | --- | --- |
| 1 | 3 | F3 | Yes |
| 2 | 4 | F4 | Yes |
| 3 | 1 | F1 | No |
| 4 | 2 | F2 | No |

Figure 8:
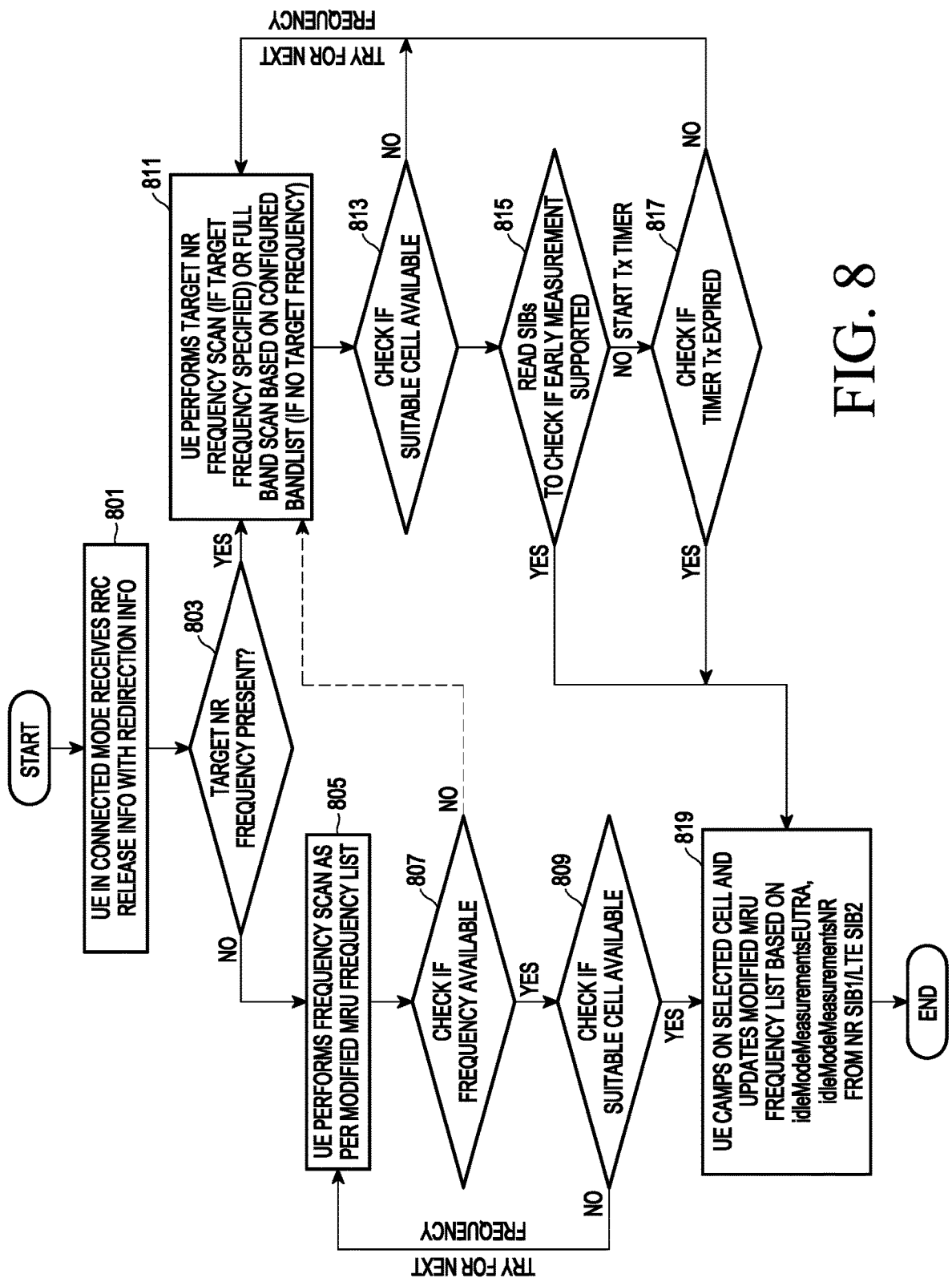
FIG. 8 illustrates a flowchart illustrating a method of identifying candidate NR cell based on early measurement feature for Inter-RAT/Intra-RAT redirection from a network according to an embodiment of the disclosure.

FIG. 8 illustrates a flowchart illustrating a method of identifying candidate NR cell based on early measurement feature for Inter-RAT/Intra-RAT redirection from a network according to an embodiment of the disclosure.

In an embodiment of the disclosure, if redirected NR frequency is not given by the network, the UE 101 may perform operations 805, 807, 809 and 819 to NR MRU frequency scan for NR frequencies based on the modified MRU frequency list. If the UE 101 finds a suitable NR cell during the MRU frequency scan, the UE 101 may camp on it. However, if the UE 101 doesn't find any suitable cell during MRU frequency scan then the UE 101 may either trigger full band scan (for example, if no MRU frequency found) while prioritizing CA/DC capable frequencies as per UE's capability. Further, if the network has redirected the UE 101 to a specific NR frequency through a radio resource control (RRC) message in operation 801, the UE 101 may trigger cell search for the specified frequency operation 803. Upon identifying a suitable NR cell by the UE 101, the UE 101 may perform operations 811, 813, 815 and 817 to determine whether the NR cell supports the early measurement feature or not by reading the IEs such as idleModeMeasurementsEUTRA, idleModeMeasurementsNR in the NR SIB1 message. If the current NR cell doesn't support the early measurement feature, then the UE 101 may start a timer (Tx) with a predetermined duration without affecting the camping experience of the UE 101 and may search for a better suitable NR cell supporting the early measurement feature within expiry of the timer. If any suitable NR cell supporting the early measurement feature is found during next frequency search before the expiry of the timer (Tx), then the UE 101 may stop the timer and may camp on that NR cell. Further, the UE 101 may update the modified MRU frequency list based on the early measurement feature of the camped cell by reading the IEs such as idleModeMeasurementsEUTRA, and idleModeMeasurementsNR broadcasted by the network in the NR SIB1. However, if the UE 101 doesn't find any suitable NR cell supporting early measurement feature before the expiry of the timer, then the UE 101 may stop the timer and may camp on the best suitable cell found before the expiry of the timer irrespective of early measurement feature. Additionally, the UE 101 may be able to reselect to the NR cell supporting early measurement feature with priority and may have faster CA/DC setup for faster data transfer leading to better user experience.

As an example, UE 101 may scan for a redirected NR Frequency F3 to find a suitable cell and may check if the found NR cell supports the early measurement feature or not as per NR SIB1 parameters in operation 801. Thereafter, the UE 101 may scan for the NR frequency F3 and may find a NR cell with Cell ID 1 in a first scan as illustrated in table 6. When the UE 101 may detect that the Cell ID 1 does not support the early measurement feature, then the UE 101 may start a timer and may continue scanning process for the NR frequency F3 to check if any suitable NR cells are available supporting the early measurement feature before the expiry of the timer. In this case, the UE 101 may scan the NR frequency F3 and may identify a NR cell with Cell ID 3 supporting the early measurement feature. Upon identifying this, the UE 101 may stop the timer and camp on the identified NR cell with Cell ID 3 (that is target NR frequency in redirection from the network is F3). Further, the UE 101 may update the modified MRU frequency list.

TABLE 6

| Cell ID | NR Frequency | Tag value |
| --- | --- | --- |
| 1 | F3 | No |
| 3 | F3 | Yes |
| 2 | F2 | No |
| 4 | F4 | Yes |

Figure 9:
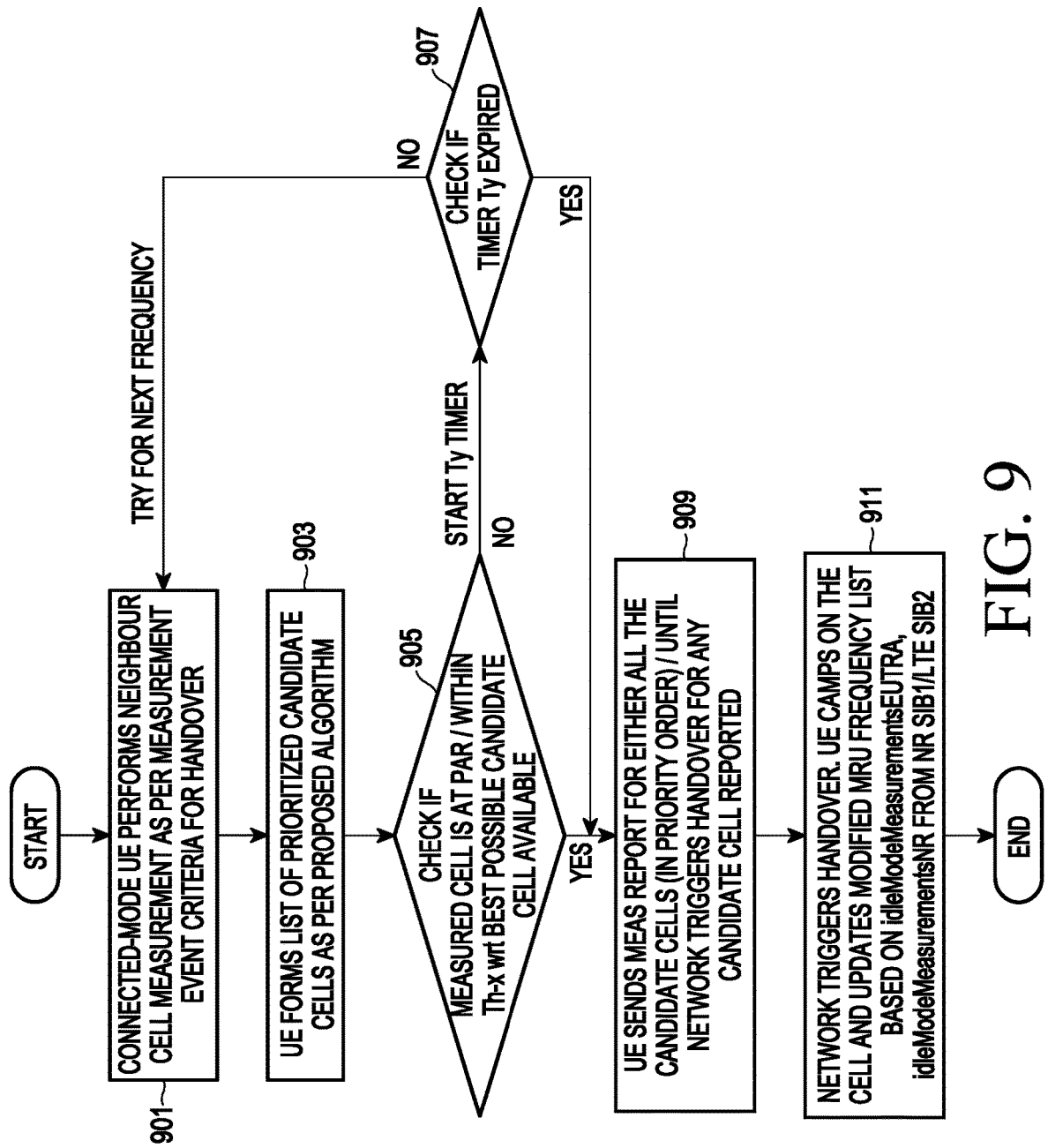
FIG. 9 illustrate a flowchart illustrating a method of identifying candidate NR cell based on early measurement feature for Inter-RAT/Intra-RAT handover in connected mode according to an embodiment of the disclosure.

FIG. 9 illustrate a flowchart illustrating a method of identifying candidate NR cell based on early measurement feature for Inter-RAT/Intra-RAT handover in connected mode according to an embodiment of the disclosure.

In an embodiment of the disclosure, the UE 101 may perform operation 901 generate a list of prioritized candidate cells based on early measurement feature, in which priority of multiple candidate cells supporting the early measurement feature is decided based on predetermined parameters such as CA/DC capable frequencies as per UE's capability, Scell/SCG/MRDC maximum achievable throughput supported by that cell, cell/signal parameters, 3GPP measurement event priority. The UE 101 may read the broadcasted message say the NR SIB1 during connected mode either using the Receive (Rx)/Transmit (Tx) in an inter-leaved manner or using any other Rx/Tx if available in the UE 101. Thereafter, the UE 101 may perform operation 903 to check the candidate cells in list of prioritized candidate cells one by one from highest priority to lowest priority. The UE 101 may perform operation 905 determine whether the selected candidate cell is either at par with the best possible candidate cell as per 3GPP specification the handover procedure, or the selected candidate cell is not inferior to the best possible candidate cell as per 3GPP specification for the handover procedure by more than a predetermined threshold value (Th-x). If the candidate cell satisfies the criteria in operation 905, the UE 101 may send the measurement report for the candidate cells according to priority order from the list of prioritized candidate cells in operation 909. For example, the UE 101 may send the measurement report for Cell ID 3 where NR frequency F3 which supports early measurement feature first, and if the Cell ID 3 is not poor than Cell ID 1 by more than a predetermined threshold value (Table 7).

TABLE 7

| Priority | Cell ID | NR Frequency |
|---|---|---|
| 1 | 3 | F3 |
| 2 | 4 | F4 |
| 3 | 1 | F1 |
| 4 | 2 | F2 |

In another embodiment of the disclosure, if the candidate cell doesn't satisfy predetermined measurement criteria in operation 905, then the UE 101 may start a timer (Ty) with predetermined time in operation 907. After expiry of the timer, the UE 101 may retry for sending the measurement report for the candidate cell if handover is not completed. For example, the measurement reports are sent if one of the neighboring NR cells is either the best neighboring NR cell satisfying the predefined measurement criteria or if the neighboring NR cells are not inferior to the best neighboring NR cell by a predefined threshold parameter. The UE 101 may repeat the process steps for next candidate cell until either all the candidate cells in the list of prioritized candidate cells are exhausted or the network triggers a handover for any of the candidate cells reported by the UE 101. Thereafter, the UE 101 may update the modified MRU frequency list based on the early measurement feature supported by the camped cell by reading the IEs such as idleModeMeasurementsEUTRA, idleModeMeasurementsNR in NR SIB1 broadcasted by the network in operation 911. Further, when the UE 101 is in connected mode, UE 101 may be able to handover to NR cell supporting early measurement feature with priority and have faster CA/DC setup for faster data transfer leading to better user experience.

In another embodiment of the disclosure, instead of waiting for the network to configure any measurement event, the UE 101 may identify the candidate neighbor NR cells with early measurement feature support by reading respective NR SIB1 messages well in advance based on the measurement events criteria (say A3 and A5) as per previous measurement events monitored in that area. Further, the UE 101 may add a pre-set offset value to actual serving cell threshold value as per the handover measurement event criteria, hence the UE 101 starts measuring neighboring cells and reading the NR SIB1 message whenever the serving cell measurement drops below the sum of the threshold value and pre-set offset value. The offset value may be configurable cell/signal parameter. Further, the UE 101 may update the database of neighbor candidate cells with identified candidate neighbor cell information which UE 101 may use during an actual handover for neighbor cell measurement reporting and may send measurement reports quickly.

Use Case in LTE:

In an embodiment of the disclosure, the UE 101 may prioritize LTE cells supporting early measurement feature over LTE cells which do not support early measurement feature in a network area associated with the UE 101. For LTE cell selection, the UE 101 may scan through MRU frequencies using a modified MRU frequency list which includes a tag value indicating the early measurement support feature for each LTE frequency. Thereafter, the UE 101 may prioritize the MRU LTE frequencies with early measurement feature over the MRU LTE frequencies without early measurement feature. The UE 101 may first prioritize and select LTE cell with early measurement feature based on IEs broadcasted by the network such as idleModeMeasurements and idleModeMeasurementsNR in LTE SIB2. Further, during LTE cell selection utilizing full band scan, the UE 101 may prefer the LTE cells supporting early measurement feature for camping over other LTE cells not supporting early measurement feature. Further, during LTE cell reselection, the UE 101 may generate a list of prioritized candidate LTE cells based on early measurement feature. Similarly, during performing measurement event (say A3 and A5) associated with Inter-RAT/Intra-RAT redirection, the UE 101 may perform the LTE MRU frequency scan utilizing the modified MRU frequency list based on early measurement feature if redirected LTE frequency is not provided to the UE 101 from the network.

In another embodiment of the disclosure, if the UE 101 does not find any MRU LTE frequency supporting the early measurement feature, the UE 101 may trigger a full band scan based on the early measurement feature. However, if the network has redirected a specific LTE frequency to the UE 101, then the UE 101 may trigger searching for LTE cells supporting the early measurement feature associated with the redirected frequency. In an embodiment of the disclosure, during Inter-RAT/Intra-RAT handover in connected mode, the UE 101 may generate a list of prioritized candidate cells satisfying the inter-rat/intra-rat measurement event criteria based on early measurement feature. Thereafter, the UE 101 may send measurement report for the LTE cells satisfying the Inter-RAT/Intra-RAT measurement event criteria with early measurement feature first and later may send the measurement report for the cells satisfying the Inter-RAT/Intra-RAT measurement event criteria without early measurement feature.

In an enhanced approach for cell selection, the UE 101 may maintain an MRU Frequency-Cell ID (MRUFC) database along with the modified MRU frequency list. Here, the UE 101 may maintain the MRUFC database with parameters which includes, without limiting to, PLMN (MCC-MNC), NR Frequency, Physical Cell ID (PCI), Cell Global Identity (CGI), Early Measurement Support, Time_of_DB_Entry (to maintain and discard old entries) and so on. During MRU frequency Scanning, the UE 101 may prioritize the modified MRU frequencies which has a tag of early measurement support feature. Further, during scanning of the cells for the selected NR frequency, the UE 101 may prioritize the PCI/CGI which belong to the selected NR Frequency, present in the same location and has an early measurement support marked as true in the MRU Frequency-Cell ID Database. Using the above scenario, the UE 101 may be able to prioritize the cells supporting early measurement feature at even more granular level and may ensure that the UE 101 selects or camps on a NR cell which supports early measurement feature. The UE 101 may also use the MRUFC database during full band scanning to prioritize cells supporting early measurement for the selected frequency. The UE 101 may update the MRUFC database once the UE 101 camps on a NR cell based on the early measurement support on the camped cell.

In an enhanced approach for cell selection, if there are no candidate cells available in the list of prioritized candidate cells which support early measurement feature and UE 101 is currently camped on a cell which doesn't support early measurement feature, then the UE 101 may select non-candidate NR cells supports early measurement feature based on NR SIB1 message. The selected non-candidate NR cells are better than the current identifies cell by a predefined threshold parameter (any cell/signal parameters). The UE 101 may prioritize the selected cells over other cells in list of prioritized candidate cells to ensure that the UE 101 reselects to a NR cell which supports early measurement feature.

Computer System

Figure 10:
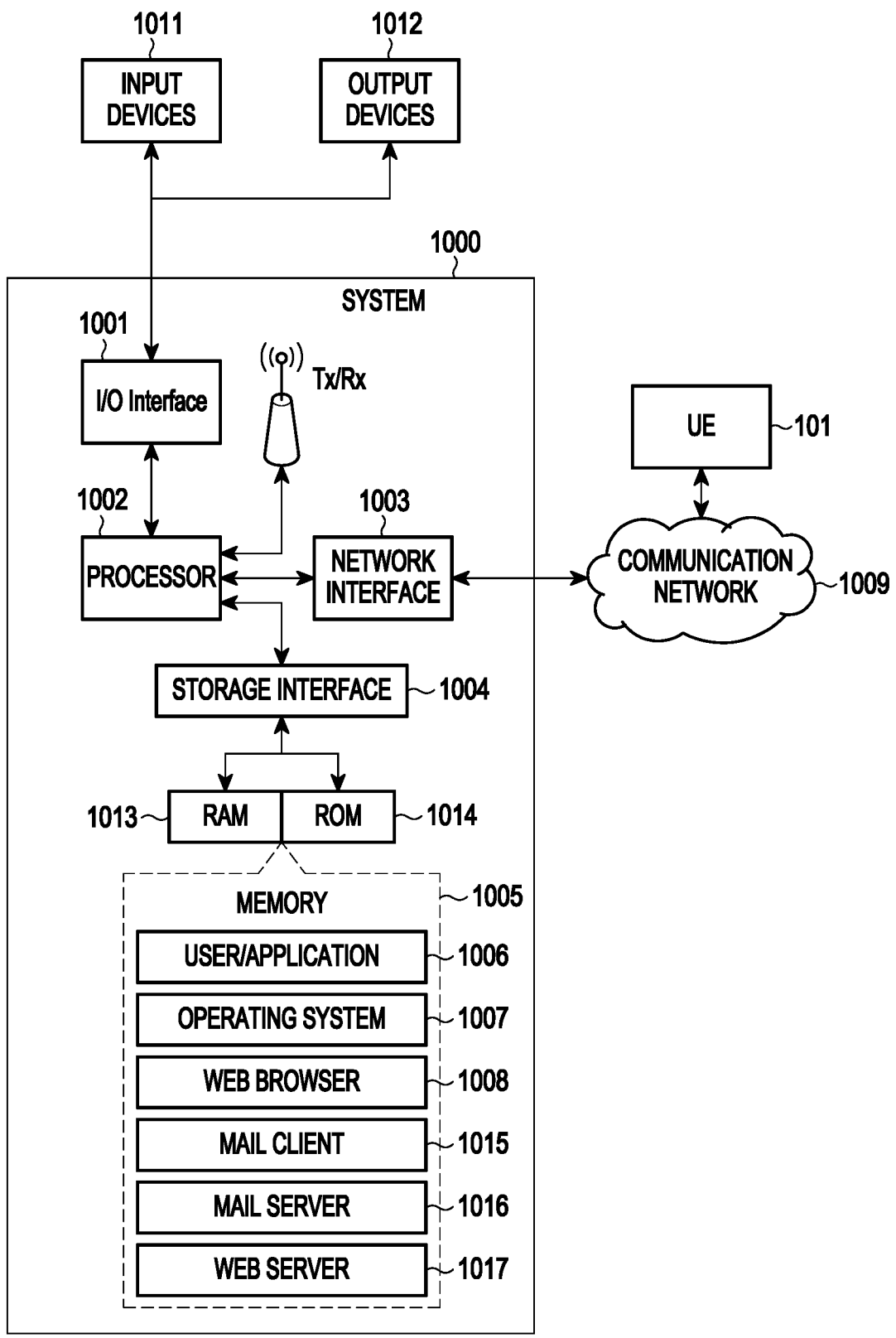
FIG. 10 illustrates a block diagram of a computer system for implementing according to an embodiment of the disclosure.

FIG. 10 illustrates a block diagram of a computer system 1000 for implementing according to an embodiment of the disclosure. In an embodiment of the disclosure, the computer system 1000 may be the UE 101 which may be used for managing cell selection in a cellular network based on early measurement feature. The computer system 1000 may include a central processing unit ("CPU" or "processor") 1002. The processor 1002 may comprise at least one data processor for executing program components for executing user or system-generated business processes. The processor 1002 may include specialized processing units such as integrated system (bus) controllers, memory management control units, floating point units, graphics processing units, digital signal processing units, etc.

The processor 1002 may be disposed in communication with one or more input/output (I/O) devices (1011 and 1012) via I/O interface 1001. The I/O interface 1001 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802. n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc. Using the I/O interface 1001, the computer system 1000 may communicate with one or more I/O devices 1011 and 1012. The computer system 1000 may receive data from UE 101.

In various embodiments of the disclosure, the processor 1002 may be disposed in communication with a communication network 1009 via a network interface 1003. The network interface 1003 may communicate with the communication network 1009. The network interface 1003 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc.

The communication network 1009 can be implemented as one of the several types of networks, such as intranet or Local Area Network (LAN) and such within the organization. The communication network 1009 may either be a dedicated network or a shared network, which represents an association of several types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 1009 may include a variety of network devices, including routers, bridges, servers, computing devices, storage devices, etc.

In various embodiments of the disclosure, the processor 1002 may be disposed in communication with a memory 1005 (e.g., Random Access Memory (RAM) 1013, Read-Only Memory (ROM) 1014, etc. as shown in FIG. 10) via a storage interface 1004. The storage interface 1004 may connect to memory 1005 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 1005 may store a collection of program or database components, including, without limitation, user/application 1006, an operating system 1007, a web browser 1008, mail client 1015, mail server 1016, web server 1017 and the like. In various embodiments of the disclosure, computer system 1000 may store user/application data 1006, such as the data, variables, records, etc. as described in this disclosure. Such databases may be implemented as fault-tolerant, relational, scalable, secure databases such as Oracle® or Sybase®.

The operating system 1007 may facilitate resource management and operation of the computer system 1000. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™, (XP™, VISTA™/7/8, 10 etc.), APPLE® IOS™, GOOGLE® ANDROID™, BLACKBERRY® OS, or the like. A user interface may facilitate display, execution, interaction, manipulation, or operation of program components through textual or graphical facilities. For example, user interfaces may provide computer interaction interface elements on a display system operatively connected to the computer system 400, such as cursors, icons, check boxes, menus, windows, widgets, etc. Graphical User Interfaces (GUIs) may be employed, including, without limitation, APPLE MACINTOSH® operating systems, IBM™ OS/2, MICROSOFT™ WINDOWS™ (XP™, VISTA™/7/8, 10 etc.), Unix® X-Windows, web interface libraries (e.g., AJAX™, DHTML™, ADOBE® FLASH™, JAVASCRIPT™, JAVA™, etc.), or the like.

Furthermore, one or more computer-readable storage media may be utilized in implementing various embodiments of the disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Versatile Disc (DVDs), flash drives, disks, and any other known physical storage media.

In an embodiment of the disclosure, it provides a method and a system for managing cell selection in a cellular network based on early measurement feature.

In an embodiment of the disclosure, it is designed to improve user experience by allowing for faster data transfer with respect to faster CA/DC configuration.

In an embodiment of the disclosure, it is extremely beneficial to User Equipment's (UEs) in terms of prioritizing the candidate cells and camping on cells which supports an early measurement feature.

In an embodiment of the disclosure, it is applicable both in the case of NR and LTE.

In an embodiment of the disclosure, it improves technology by providing users with better 5G throughput, faster data transmission and overall 5G experience of the user is enhanced.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the disclosure.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the disclosure need not include the device itself.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based here on. Accordingly, the embodiments of the disclosure are intended to be illustrative, but not limiting, of the scope of the disclosure, which is set forth in the following claims.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed for managing a cell selection by a user equipment (UE) in a cellular network, the method comprising:
    detecting that a signal strength of a first cell to which the UE is connected is below at least one threshold parameter;
    identifying a plurality of secondary cells, in a vicinity of the UE, wherein the identified plurality of secondary cells includes:
        at least one first secondary cell having signal strengths greater than the at least one threshold parameter and supporting early measurement features, and
        at least one second secondary cell having signal strengths greater than the at least one threshold parameter and not supporting the early measurement features; and
    selecting the at least one first secondary cell, from among the identified plurality of secondary cells, for connecting to the cellular network, by prioritizing the at least one first secondary cell supporting the early measurement features over the at least one second secondary cell not supporting the early measurement features.

2. The method of claim 1, further comprising:
    determining the early measurement features based on information elements (IEs) broadcasted by the cellular network.

3. The method of claim 1, wherein the identifying of the plurality of secondary cells comprises:
    scanning of a most recently used (MRU) frequency list, which supports the early measurement features; or
    scanning of a full band across all bands supported by the UE.

4. The method of claim 1, further comprising:
    selecting the at least one first secondary cell using frequencies in a most recently used (MRU) frequency list, a full band scan across all bands, a new radio (NR) cell reselection, a network redirection, or a connected mode handover.

5. The method of claim 4, wherein the selecting of the at least one first secondary cell comprises:
    generating a modified MRU frequency list with a tag indicating whether each NR frequency present in the MRU frequency list supports an early measurement feature or does not support the early measurement feature.

6. The method of claim 4, further comprising:
    generating a list of prioritized candidate cells based on the early measurement features which is determined based on carrier aggregation (CA) and dual connectivity (DC) capable frequencies;
    identifying a new NR cell for a first predetermined time, when an available NR cell does not support an early measurement feature; and
    updating a modified MRU frequency list, after identifying a camped cell based on the early measurement feature broadcasted by the cellular network.

7. The method of claim 4, further comprising:
    generating a list of prioritized candidate cells based on the early measurement features broadcasted by the cellular network;
    identifying a new NR cell for a first predetermined time, when an available NR cell does not support an early measurement feature;
    reselecting a first NR cell based on an early measurement feature in the candidate cells, when the first NR cell is either a best NR cell in the prioritized candidate cells list satisfying a predefined cell reselection criteria or when the first NR cell is not inferior to the best NR cell by a predefined threshold parameter; and
    reselecting a second NR cell, with a lower priority, when compared to the first NR cell, when the first NR cell is not the best NR cell or the first NR cell is inferior to the best NR cell by a predefined threshold parameter.

8. The method of claim 4, further comprising:
detecting NR cells supporting the early measurement features;
performing a NR MRU frequency scan when no redirected NR frequency is configured by the cellular network;
performing a target frequency scan when redirected NR frequency is configured by the cellular network;
performing a full band scan when suitable cells were not found during MRU frequencies scan; and
updating a modified MRU frequency list as per early measurement support of a camped cell,
wherein the UE selects a neighboring NR cell supporting an early measurement when the UE detects, within a candidate priority list, a neighboring NR cell supporting early measurement feature within a predefined time period.

9. The method of claim 4, further comprising:
selecting the at least on secondary cell during the connected mode handover based on a list of prioritized candidate cells satisfying an inter-radio access technology (RAT) or an intra-RAT measurement event criteria corresponding to a predefined measurement criteria,
detecting a measurement event triggered by an NR in the cellular network when the UE is in a connected mode;
detecting NR cell frequencies supported by neighboring NR cells that satisfy a predefined measurement criteria for the measurement event;
determining the early measurement features support based on information elements (IEs) broadcasted by the cellular network after detecting the NR cell frequencies;
creating a candidate priority list comprising the neighboring NR cells that support the early measurement features based on the predefined measurement criteria;
finding an additional NR cell for second predefined time when the at least one first secondary cell does not support the early measurement feature within a first predefined time and updating a modified MRU frequency list as per an early measurement feature support of a camped cell; and
sending measurement reports for the neighboring NR cells in the candidate priority list that support the early measurement feature,
wherein the measurement reports are sent if one of the neighboring NR cells is either a best neighboring NR cell satisfying the predefined measurement criteria or if the neighboring NR cells are not inferior to the best neighboring NR cell by a predefined threshold parameter.

10. The method of claim 4, further comprising:
prioritizing cells during the NR cell reselection and a connected mode handover based on carrier aggregation or dual connectivity frequency supported by the cell and the UE, signal strength of the cell and a maximum throughput when there are multiple cells supporting early measurement feature.

11. A user equipment (UE) for managing cell selection in a cellular network, the UE comprising:
memory storing instructions; and
at least one processor communicatively coupled to the memory,
wherein the instructions, when executed by the at least one processor individually or collectively, cause the UE to:
detect that a signal strength of a first cell to which the UE is connected is below at least one threshold parameter,
identify a plurality of secondary cells, in a vicinity of the UE, wherein the identified plurality of secondary cells includes:
at least one first secondary cell having signal strengths greater than the threshold parameters and supporting early measurement features, and
at least one second secondary cell having signal strengths greater than the at least one threshold parameter and not supporting the early measurement features, and
select the at least one first secondary cell, from among the identified plurality of secondary cells, for connecting to the cellular network, by prioritizing the at least one first secondary cell supporting the early measurement features over the at least one second secondary cell not supporting the early measurement features.

12. The UE of claim 11, wherein the instructions, when executed by the at least one processor individually or collectively, further cause the UE to:
determine the early measurement features based on information elements (IEs) broadcasted by the cellular network.

13. The UE of claim 11, wherein the instructions, when executed by the at least one processor individually or collectively, further cause the UE to:
scan a most recently used (MRU) frequency list, which supports the early measurement features, or
scan a full band across all bands supported by the UE.

14. The UE of claim 11, wherein the instructions, when executed by the at least one processor individually or collectively, further cause the UE to:
select the at least one first secondary cell using frequencies in a most recently used (MRU) frequency list, a full band scan across all bands, a new radio (NR) cell reselection, a network redirection, or a connected mode handover.

15. The UE of claim 14, wherein the instructions, when executed by the at least one processor individually or collectively, further cause the UE to:
generate a modified MRU frequency list with a tag indicating whether each NR frequency present in the MRU frequency list supports an early measurement feature or does not support the early measurement feature.

16. The UE of claim 14, wherein the instructions, when executed by the at least one processor individually or collectively, further cause the UE to:
generate a list of prioritized candidate cells based on the early measurement features which is determined based on carrier aggregation (CA) and dual connectivity (DC) capable frequencies,
identify a new NR cell for a first predetermined time, when an available NR cell does not support an early measurement feature, and
update a modified MRU frequency list, after identifying a camped cell based on the early measurement feature broadcasted by the cellular network.

17. The UE of claim 14, wherein the instructions, when executed by the at least one processor individually or collectively, further cause the UE to:
generate a list of prioritized candidate cells based on the early measurement features broadcasted by the cellular network, identify a new NR cell for a first predetermined time, when an available NR cell does not support an early measurement feature, reselect a first NR cell based on an early measurement feature in the candidate cells, when the first NR cell is either a best NR cell in the prioritized candidate cells list satisfying a predefined cell reselection criteria or when the first NR cell is not inferior to the best NR cell by a predefined threshold parameter, and reselect a second NR cell, with a lower priority, when compared to the first NR cell, when the first NR cell is not the best NR cell or the first NR cell is inferior to the best NR cell by a predefined threshold parameter.

18. The UE of claim 14, wherein the instructions, when executed by the at least one processor individually or collectively, further cause the UE to:

detect NR cells supporting the early measurement features, perform a NR MRU frequency scan when no redirected NR frequency is configured by the cellular network, perform a target frequency scan when redirected NR frequency is configured by the cellular network, perform a full band scan when suitable cells were not found during MRU frequencies scan, and update a modified MRU frequency list as per early measurement support of a camped cell, and wherein the UE selects a neighboring NR cell supporting an early measurement when the UE detects, within a candidate priority list, a neighboring NR cell supporting early measurement feature within a predefined time period.

19. The UE of claim 14, wherein the instructions, when executed by the at least one processor individually or collectively, further cause the UE to:

select the at least on secondary cell during the connected mode handover based on a list of prioritized candidate cells satisfying an inter-radio access technology (RAT) or an intra-RAT measurement event criteria corresponding to a predefined measurement criteria, and detect a measurement event triggered by an NR in the cellular network when the UE is in a connected mode, detect NR cell frequencies supported by neighboring NR cells that satisfy a predefined measurement criteria for the measurement event, determine the early measurement features support based on information elements (IEs) broadcasted by the cellular network after detecting the NR cell frequencies, create a candidate priority list comprising the neighboring NR cells that support the early measurement features based on the predefined measurement criteria, find an additional NR cell for second predefined time when the at least one first secondary cell does not support the early measurement feature within a first predefined time and updating a modified MRU frequency list as per an early measurement feature support of a camped cell, and send measurement reports for the neighboring NR cells in the candidate priority list that support the early measurement feature, and wherein the measurement reports are sent if one of the neighboring NR cells is either a best neighboring NR cell satisfying the predefined measurement criteria or if the neighboring NR cells are not inferior to the best neighboring NR cell by a predefined threshold parameter.

20. The UE of claim 14, wherein the instructions, when executed by the at least one processor individually or collectively, further cause the UE to:

prioritize cells during the NR cell reselection and a connected mode handover based on carrier aggregation or dual connectivity frequency supported by the cell and the UE, signal strength of the cell and a maximum throughput when there are multiple cells supporting early measurement feature.

\* \* \* \* \*